United States Patent [19]
Suzuki et al.

[11] Patent Number: 5,339,255
[45] Date of Patent: Aug. 16, 1994

[54] METHOD OF CONTROLLING SYNTHESIS REACTION

[75] Inventors: Fumiyuki Suzuki; Tohru Ogura; Yukio Shirakura, all of Shizuoka, Japan

[73] Assignee: Fuji Photo Film Co., Ltd., Kanagawa, Japan

[21] Appl. No.: 15,597

[22] Filed: Feb. 10, 1993

[30] Foreign Application Priority Data

Feb. 14, 1992 [JP] Japan ................................. 4-059122

[51] Int. Cl.⁵ ...................... G06F 15/46; G06G 7/58
[52] U.S. Cl. ..................... 364/500; 528/272; 528/335; 324/96; 250/338.1; 250/338.5; 250/341; 356/51; 364/498; 364/499; 364/576
[58] Field of Search .................. 528/272, 335; 324/96; 250/338.1, 338.5, 341; 356/51; 364/498, 499, 500, 576

[56] References Cited

U.S. PATENT DOCUMENTS

4,830,887 5/1989 Reiter .................... 427/420

FOREIGN PATENT DOCUMENTS

| | | |
|---|---|---|
| 51238 | 5/1982 | European Pat. Off. . |
| 115621 | 8/1984 | European Pat. Off. . |
| 327020 | 8/1989 | European Pat. Off. . |
| 52-5895 | 1/1977 | Japan . |
| 1508198 | 4/1978 | United Kingdom . |

OTHER PUBLICATIONS

CA95(2):7841v.
Patent Abstracts of Japan, vol. 13, No. 111 (C-577), Mar. 16, 1989 & JP-A-63 287 575 (Fuji Photo Film Co., Ltd.).
Patent Abstracts of Japan, vol. 13, No. 111 (C-577), Mar. 16, 1989 & JP-A-63 287 574 (Fuji Photo Film Co., Ltd.).

*Primary Examiner*—Samuel A. Acquah
*Attorney, Agent, or Firm*—Sughrue, Mion, Zinn, Macpeak & Seas

[57] ABSTRACT

A method for controlling synthesis reaction of a synthetic high molecular resin, the method measuring continuously an infrared spectral absorption of a reaction intermediate product of polycondensation reaction. And the method controls reaction conditions on the basis of the measured infrared spectral absorption.

4 Claims, 3 Drawing Sheets

METHOD OF CONTROLLING SYNTHESIS REACTION

BACKGROUND OF THE INVENTION

The present invention relates to a method of producing polyethylene terephthalate from an aromatic dicarboxylic acid or the derivative thereof and a glycol in the case of producing a synthetic high molecular resin, e.g. a production step of polyester. More particularly, the invention relates to a process of controlling a reaction such that an analyzed value during substantially continuously analyzing a reaction liquid becomes a desired value for stably producing a low polymer having desired properties in a synthesis step, e.g. in an esterification step.

As one of the industrial production processes of synthetic resins, such as, for example, polyethylene terephthalate useful for fibers, films, or molding materials a direct polymerization process of continuously producing polyethylene terephthalate by obtaining bis-$\beta$-hydroxyethyl terephthalate and/or a low polymer by the esterification reaction in the synthesis step of terephthalic acid and ethylene glycol and then by polycondensing the product is well known. In a continuous polymerization apparatus being used for such a continuous polymerization process, the molten viscosity (hereinafter, is referred to as simply "viscosity") of the polymer formed is measured at the end of the polymerization reaction and the polymerization degree of the polymer is controlled, for example, by changing the vacuum of the polymerization reactor such that the viscosity becomes an desired value, as described in JP-A-52-5895 (the term "JP-A" as used herein means an "unexamined published Japanese patent application").

The viscosity of the polymer synthesized is the index of the properties of the polymer, such as the molecular weight, etc., and is very important in the case of applying a necessary work such as an extrusion, an elongation, etc., to the polymer obtained. For example, if the viscosity is increased, an excessive load is applied to an extruding machine, whereby the polymer can not stably extruded. Also, at the elongation of the polymer, the tension is too increased to be elongated to a desired width and also large troubles such as the breakage of the film of the polymer occur. On the contrary, if the viscosity is lowered, serious problems for product quality that the film of the polymer is slackened at the elongation to reduce the flatness of the film, etc., occur. Accordingly, it is usually necessary that the viscosity of the polymer is restrained in the fluctuation range of about 50 poises to the desired viscosity.

However, in the case of changing the vacuity of the polymerization reactor for adjusting the viscosity of the polymer formed to an desired value, since it takes several tens minutes to several hours to transfer the polymer to a viscosity measuring apparatus from the polymerization reactor in the conventional process, the viscosity is reluctant to be settled even by carrying out self controlling by making a feedback loop, thereby it is inevitable to make dull the response to the change of the viscosity.

Accordingly, for adjusting the viscosity of the polymer to the desired value, it is necessary to restrain the change of the viscosity as completely as possible by maintaining other conditions as uniformly as possible, for example, the temperature and pressure of the esterification and/or the polycondensing system, etc..

However, even when the foregoing process is practiced, since the viscosity which is one of the properties of the polymer is measured at a last process of the polymerization and is not directly measured during the polymerization process, there is the problem that when the process is fluctuated by the occurrence of unexpected external disturbances such as, for example, the change of the supplying amount of ethylene glycol, the change of the supplying amounts of additives, etc., it takes several hours to several tens hours before appearing a change in the viscosity of the polymer being produced and hence the abnormality can not frequently be detected immediately, whereby the operation of the apparatus is continued for a while with the occurrence of the inferior esterification, the abnormal polymerization, etc., which results in giving the high possibility of producing a large amount of non-standardized products.

Also, when the supplying amounts of raw materials are increased for increasing the amounts of products, in particular, the esterification becomes unstable and as the case may be, the polymerizing property is greatly lowered and the polymer obtained can not sometimes form a film. Or, even when the polymer can form a film, there is a problem that the physical properties of the film, such as the flatness of the film, the tear resistance of the film, etc., are not uniform to reduce the commercial value of the product.

SUMMARY OF THE INVENTION

The object of the present invention is to solve the above-described conventional problems and to provide a reaction controlling process of carrying out the measurement of the property of a product being produced in a synthetic step capable of stable producing a polymer having desired properties without producing non-standardized products even in the case of fluctuation in the process by the occurrence of unexpected external disturbances such as the change of the supplying amount of ethylene glycol, the change of the supplying amounts of additives, etc., or in the case of changing the supplying amounts of raw materials for increasing or decreasing the amount of the product.

Hitherto, in the case of measuring the properties of a polymer in the polymerization process thereof, the viscosity of the polymer is measured only at the last process of the polymerization. But the inventors have paid special attention to that the property of an intermediate product in a synthesis process of a polymer, in particular, the property about the polymerization property of the intermediate product is directly measured to immediately detect the fluctuation of the process, if any, and in the case of detecting the fluctuation of the process, the countermeasures for stabilizing the polycondensation reaction, e.g. an esterification step and the polymerization step, is quickly taken, and have accomplished the present invention.

That is, the present invention is provided with a following method for achieving the foregoing object.

Thus, according to the present invention, there is provided a reaction controlling process, which comprises in a synthesis step of a synthetic high molecular resin, while substantially continuously measuring the infrared spectral absorption of a reaction intermediate product of the polycondensation reaction and controlling the reaction condition based in the measured result.

In a preferred embodiment of the present invention, in the reaction controlling process described above, the synthetic high molecular resin is a polyester resin and the reaction intermediate product is a low polymerization product of polyester.

Also, in a specific embodiment of the present invention, in the reaction controlling process described above, the infrared spectral absorption being measured is the infrared spectral absorption of a carboxyl group.

Furthermore, in another specific embodiment of the present invention, in the reaction controlling process described above, the result of measuring the infrared spectral absorption is the concentration of a carboxyl group obtained by the processing with a Fourier transformation.

The synthetic high molecular resin in the present invention is a polyester resin or a polyamide resin.

In the synthetic step being used in the present invention, wherein the intermediate product is a low polymerization product of polyester, an aromatic dicarboxylic acid or the derivatives thereof and a glycol are used.

As the aromatic dicarboxylic acid or the derivative thereof being used in the present invention, there are terephthalic acid, isophthalic acid, $\alpha$-$\beta$-oxyethoxybenzoic acid, 2,6-naphthalenedicarboxylic acid, 4,4'-dicarboxyphenyl, 4,4'-dicarboxylbenzophenone, his(4-carboxyphenyl)ethane, 5-sodium sulfoneisophthalate, and the alkyl (methyl, ethyl propyl, etc.) esters of them.

As the glycol being used in the present invention, there are ethylene glycol, propylene glycol, butanediol, neopentyl glycol, diethylene glycol, cyclohexane dimethanol, ethylene oxide addition product of hisphenol A, etc.

In the present invention, as the polyamide resin, a reaction product of a diamine and a dibasic acid is used. As the diamine, there are hexamethylenediamine, methaxylylenediamine, 1,4-diaminobutane, etc., and as the dibasic acid, there are terephthalic acid, adipic acid, sebacic acid, dodecane diacid, etc.

The present invention can be used for not only a continuous reaction apparatus but also for a batch-type reaction apparatus.

As the reaction conditions in the present invention, in, for example, the esterification step for forming a polyester resin, the difference between spectrums by an infrared spectrophotometer corresponding to carboxyl group is directly read from a molten oligomer, and as the reaction conditions, the operation conditions, e.g. the ratio and the amounts of the raw materials supplied to the esterification step, the temperature of each part of the step, the redistributed amount of ethylene glycol in the redistribution line of ethylene glycol, the temperature and the vacuity of the polycondensation system, etc., are changed to improve the controlling property of the step and stabilize the quality of the products.

In the present invention, a good result is obtained by determining the concentration of a carboxyl group from the value obtained by processing with the Fourier transformation the measured result of the spectral absorption by an infrared spectrophotometer.

It is known that in the reaction of terephthalic acid and ethylene glycol, the carboxyl terminal originated from terephthalic acid remaining in the oligomer has an absorption in the wave number range of from 3,000 $cm^{-1}$ to 3,500 $cm^{-1}$ according to the state of the OH, and in the present invention, the absorption of the carboxyl group is observed in the wave number range of from 3,000 $cm^{-1}$ to 3,500$^{-1}$, preferably from 3,200 $cm^{-1}$ to 3,500 $cm^{-1}$, and more preferably from 3,300 $cm^{-1}$ to 3,400$^{-1}$ or in the present invention, it is preferred to use the absorption in each wave number range of from 3,400 $cm^{-1}$ to 3,500 $cm^{-1}$ for the calculation of the concentration of the carboxyl group.

DETAILED DESCRIPTION OF THE PREFERRED EMBODIMENT

Figure 1:
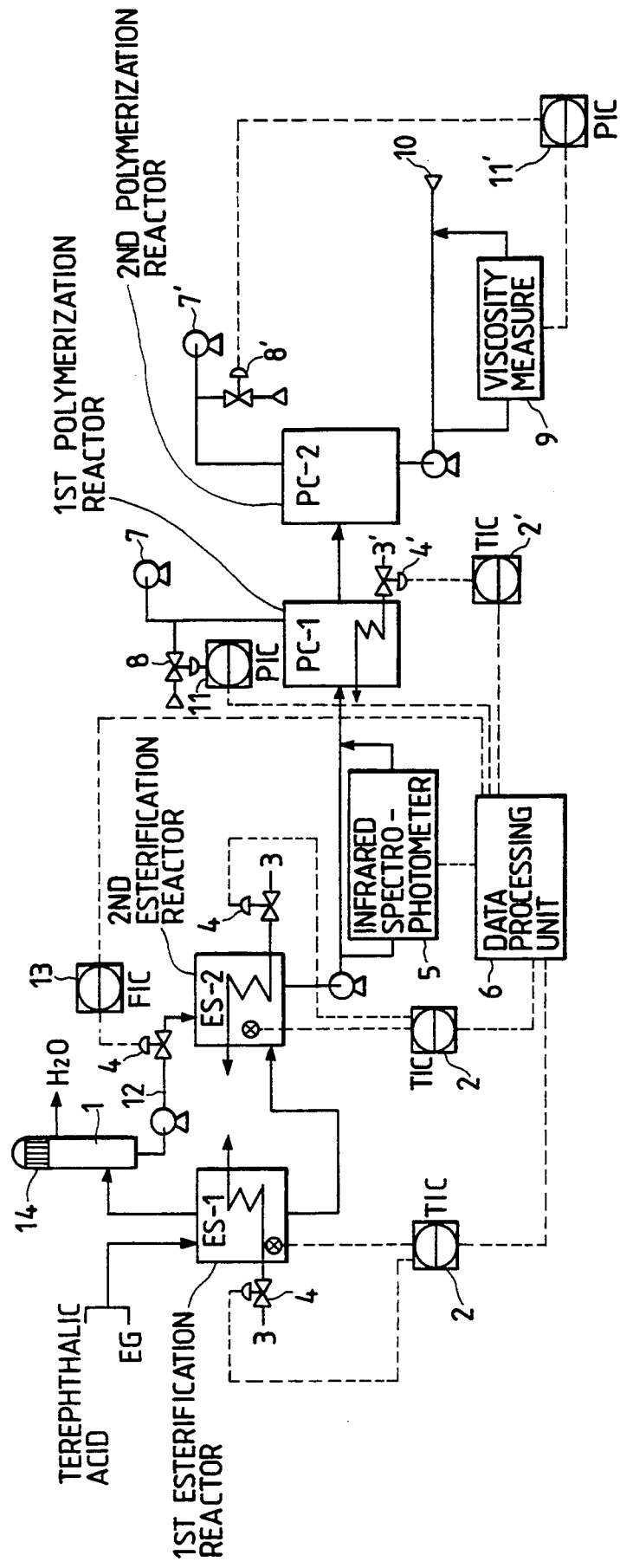
FIG. 1 is a flow sheet showing a production step composed of an esterification step and a polymerization step in a continued series for the reaction controlling process of an example of the present invention.

Then, an embodiment of the case of applying the process of the present invention to a reaction step is explained by referring to FIG. 1.

FIG. 1 is a flow sheet showing a production step composed of an esterification step and a polymerization step in a continued series for the reaction controlling process of an example of the present invention.

In the esterification step, a 1st esterification reactor ES - 1 and a 2nd esterification reactor ES - 2 are connected in series and a low polymerized polymer is sent to the subsequent polymerization step from the 2nd esterification reactor. The polymerization step is composed of continuous steps of a 1st polymerization reactor PC - 1 and a final polymerization reactor PC - 2.

In FIG. 1, an apparatus performing the method of the present invention is provided with a distillation tower 1 which has a cooling device 14, temperature controllers 2 and 2' heat mediums 3 and 3', flow rate control valves 4 and 4', a flow cell and an infrared spectrophotometer 5, and a data processing apparatus 6 for subjecting the data from the infrared spectrophotometer 5 to a Fourier transformation. In the process shown by FIG. 1, the result of data processing is fed back to the temperature controllers 2 of the esterification reactors ES - 1 and ES - 2 and to a flow rate controller 13 of an ethylene glycol redistribution line 12. And further the result of data processing is fed forward to a vacuum pressure controller 11, which controls a vacuum pressure control valve 8 to be connected to a vacuum pump 7, and to a temperature controller 2' of the polymerization reactor PC - 1. A viscosity measuring device 9 measures a viscosity of the polymerized resin from the polymerization reactor PC - 2, in which the polymerized resin is transferred to a die-head 10. And the measured value of the viscosity is fed back to a vacuum pressure controller 11', which controls a vacuum pressure control valve 8' to be connected to a vacuum pump 7' for the polymerization reactor PC - 2.

When the esterification step is continuously connected to the polymerization step, the controls of the feed back and the feed forward are simultaneously carried out but when the esterification step is separated from the polymerization step, the control is carried out for the feed back only.

Figure 2:
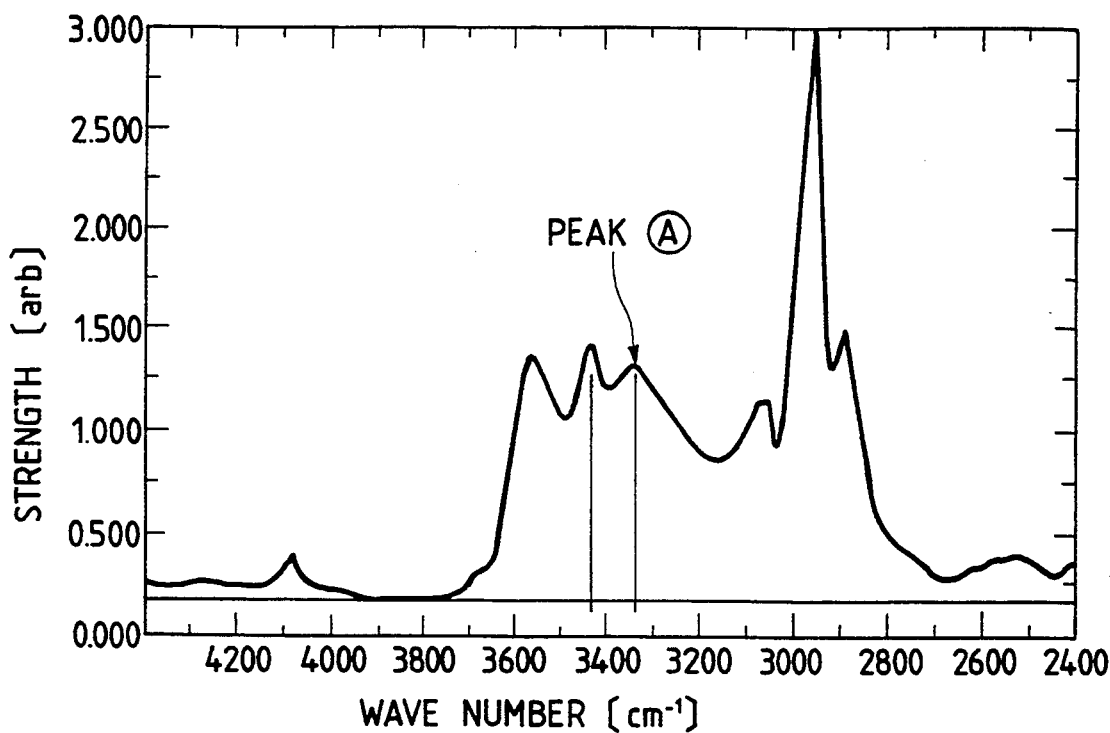
FIG. 2 is a graph showing a spectral chart (the term "arb" of the ordinate means an arbitrary unit which is used the value on the measured chart as it is and shows a relative value) obtained by Fourier transforming the measured result of the infrared spectral absorption using the process of an example of the present invention.

FIG. 2 shows the data (spectral chart) obtained by processing with a Fourier transformation the actually measured result of the spectral absorption of the oligomer in a molten state by an infrared spectrophotometer.

In the absorption shown in the data, the peak intensity of the absorption peak A having the peak near, for example, about 3350 cm$^{-1}$ has a good correlation with the peak intensity of the curve formed by plotting the value of the concentration of the carboxyl group in the oligomer obtained by other method than the infrared spectral absorption, such as a titration, etc., on a graph.

Figure 3:
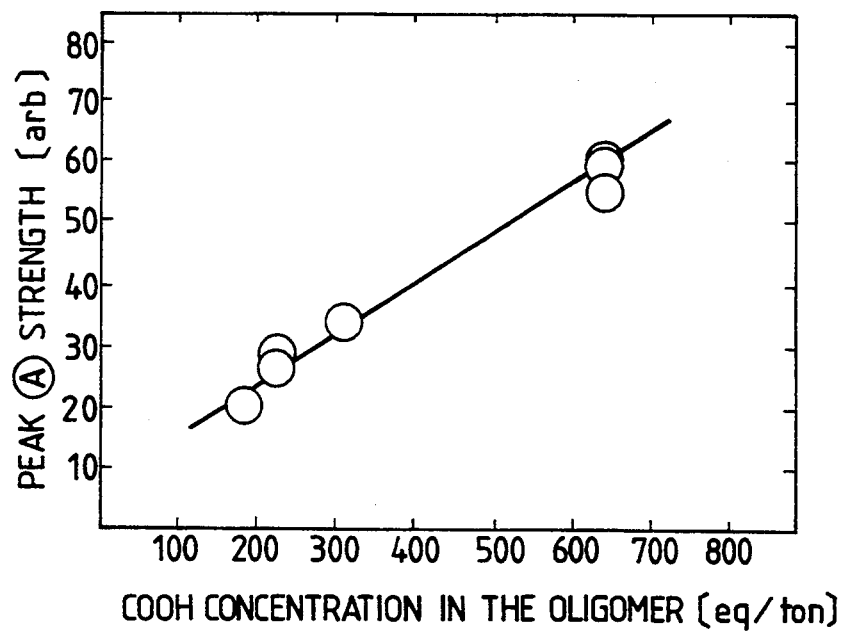
FIG. 3 is a chart (the term "arb" of the ordinate shows a relative value as in FIG. 2) showing the correlation of the peak strength of the infrared spectral absorption chart obtained by using the process of this invention and the concentration of COOH in the oligomer.

FIG. 3 shows the graph. (In FIGS. 2 and 3, the intensity "arb" means an arbitrary unit, is used without converting the value on the measured chart, and shows a relative value.)

Then, the effect of the present invention is explained by the following examples but the invention is not limited to these examples.

COMPARISON EXAMPLE 1

Figure 5:
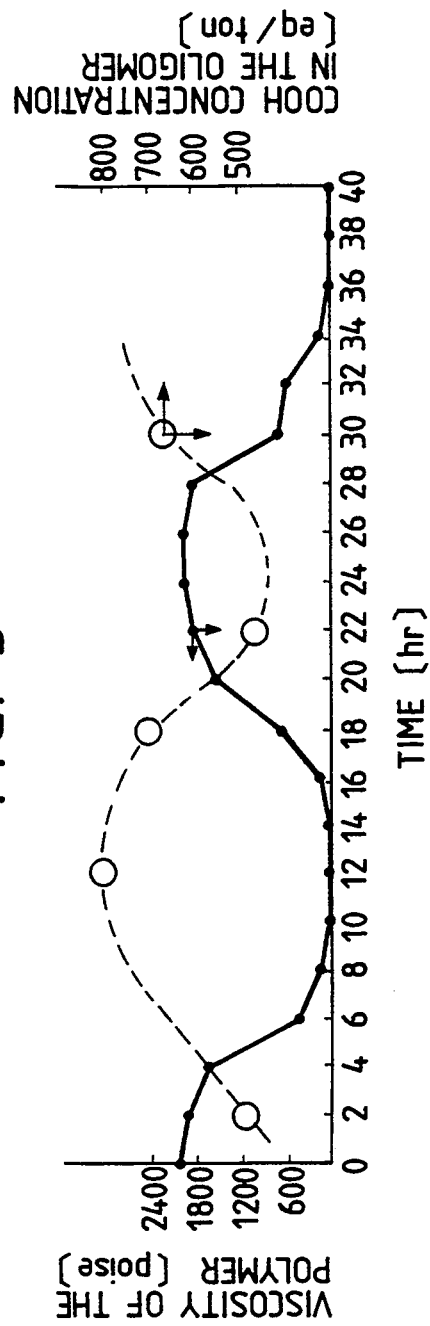
FIG. 5 is a graph showing the relation of the concentration of COOH in the oligomer and the viscosity of the polymer with the passage of time measured by a conventional reaction controlling process.

While keeping the ratio of 72 parts by weight of terephthalic acid and 30 parts of ethylene glycol as raw materials, they were continuously supplied to the 1st esterification reactor ES - 1 as shown in FIG. 1 and further antimony trioxide was added to the system as a catalyst in an amount of 200 ppm to the theoretical yield for a polymer being produced to carry out the esterification. Furthermore, trimethyl phosphate was added thereto in an amount of 170 ppm to the theoretical amount of the polymer and when the controlling temperatures for the esterification reactors ES - 1 and ES - 2 in the continuous polymerization apparatus of polyester for carrying out the polycondensation shown in FIG. were set to 242° C. and 244° C., respectively, the amount of COOH in the oligomer at the outlet of the final esterification reactor ES - 2 was greatly fluctuated, whereby in spite of controlling the viscosity of the polymer at a constant value at the end of the polymerization reaction by controlling the vacuity of the polymerization reactor, the viscosity could not be controlled to greatly fluctuate the viscosity and the polymer could not stably produced. The state of the viscosity fluctuation is shown in FIG. 5.

EXAMPLE 1

In the step shown in Comparison Example 1, the oligomer in a molten state was continuously sampled from the final reactor ES - 2 of the esterification step and the infrared absorption spectrum thereof was measured by the flow cell and the infrared spectrophotometer.

In this case, at the measurement of the infrared absorption spectrum, it is preferred to use the measuring cell enduring a high temperature and a high pressure and also it is preferred to use the spectrophotometer resisting to dusts and vibration.

When the temperature of reactors in the esterification step was controlled such that the value of the concentration of the carboxylic acid obtained by processing the foregoing measured value with a Fourier transformation became 450 (equivalents/ton), the polymerization process could be operated with a stable viscosity.

Figure 4:
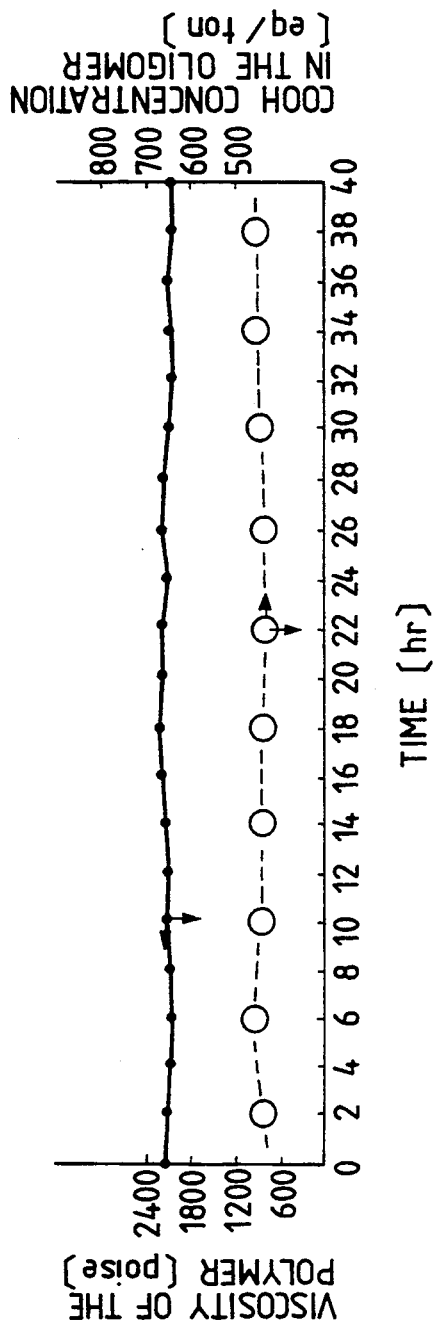
FIG. 4 is a graph showing the relation of the concentration of COOH in the oligomer and the viscosity of the polymer with the passage of time measured by the reaction controlling process of the present invention.

The result is shown in FIG. 4. In this case, the average temperature of the esterification reactors was about 243° C.

The polymer thus obtained not only had a stabilized viscosity but also had stabilized physical properties such as the flatness at film forming, the tear resistance, the adhesive property of a photographic silver halide emulsion with the film formed from the polymer, etc.

COMPARISON EXAMPLE 2

While keeping 72 parts by weight of terephthalic acid and 30 parts by weight of ethylene glycol as raw materials, the raw materials were continuously supplied to the 1st esterification reactor ES - 1 shown in FIG. 1 as a slurry and further antimony trioxide was added to the system as a catalyst in an amount of 200 ppm to the theoretical yield of the polymer being obtained to carry out the esterification. With respect to a degree of esterification, the temperatures of the esterification reactors ES - 1 and ES - 2 were set at 248° C each. Furthermore, trimethyl phosphate was added to the system in an amount of 170 ppm to the theoretical yield of the polymer. When in the foregoing continuous polymerization apparatus of polyester for carrying out the polycondensation, the supplying amounts of the raw materials were gradually increased, the viscosity of the polymer became uncontrollable when the supplying amounts reached 118% of the ordinary supplying amounts and the viscosity was suddenly lowered at 2,800 poises, thereby the polymer obtained could not form tips.

The concentration of COOH of the oligomer in the state incapable of forming tips at the outlet of the 2nd esterification reactor ES - 2 was from 550 to 650 (equivalents/ton).

EXAMPLE 2

When in Comparison Example 2 described above, the concentration of the carboxylic acid in the oligomer was measured by the same method as in Example 1 and the supplying amount of ethylene glycol as the raw material was controlled such that the concentration became 350 (equivalents/ton), the amount of ethylene glycol was increased and the equivalent ratio of ethylene glycol to terephthalic acid became 1.25. In this case, the viscosity of the polymer thus obtained was 2,800 poises and the polymer could be stably produced.

COMPARISON EXAMPLE 3

While keeping 72 parts by weight of terephthalate and 30 parts by weight of ethylene glycol as raw materials, the raw materials were continuously supplied as a slurry and further antimony trioxide was added to the mixture as a catalyst in an amount of 200 ppm to the theoretical yield of the polymer being obtained to carry out the esterification. For the esterification, the temperatures of the esterification reactors ES - 1 and ES - 2 in the system shown in FIG. 1 were set at 245° C. each. Furthermore, trimethyl phosphate was added to the system in an amount of 170 ppm to the theoretical yield of the polymer.

In the continuous polymerization apparatus of polyester for carrying out the polycondensation, the temperature of the distilling tower 1 was fluctuated by the reason of fluctuating the amount of cooling water of a cooler 14 of the distilling tower 1, whereby the amount of ethylene glycol in a redistribution line 12 for ethylene glycol did not become constant and in spite of setting the viscosity of the polymer formed to 2,800 poises, the viscosity slowly fluctuated in the range of from 2,600 to 3,000 poises and could not be controlled well.

EXAMPLE 3

The carboxylic acid concentration of the oligomer in Comparison Example 3 was from 300 to 580 (equivalents/ton) but when the carboxylic acid concentration was automatically and continuously measured as in Example 1 and the amount of ethylene glycol in the redistribution line of ethylene glycol was controlled such that the carboxylic acid concentration became 500 (equivalents/ton), the redistributing amount was stabilized at the ratio of about 3.5 parts by weight, the viscosity of the polymer was settled at from 2,750 to 2,850 poises, and the physical properties of the polymer film obtained were stabilized.

As described above, according to the reaction controlling process of the present invention, even when unexpected external disturbances such as the change of the supplying amount of ethylene glycol and the change of the supplying amounts of additives occur in the esterification step, the polymer having desired properties can be stably produced without accompanied by the fluctuation of the step and the trouble of producing a large amount of non-standardized product can be prevented.

Also, in the case of increasing the amount of the product using a same synthesis apparatus, in a conventional controlling process, there are problems that the esterification reaction state is liable to become unstable and the properties of the polymer in the polycondensation system can not be kept constant, but according to the present invention, the properties of the polymer produced can be stably kept and the amount of the product can be greatly increased.

Moreover, since in the process of the present invention, the carboxylic acid concentration of the oligomer can be controlled in a wide range, new film properties are imparted and a specific polymer such as the polymer having a high carboxylic acid concentration can be stably synthesized by controlling the molecular weight distribution of the polymer.

What is claimed is:

1. A method of controlling synthesis reaction of a synthetic high molecular resin comprising a polymer resin, comprising the steps of:
   substantially continuously measuring an infrared spectral absorption of a reaction intermediate product comprising a low polymerization polyester product of a polycondensation reaction; and
   controlling reaction conditions on the basis of said measured infrared spectral absorption.

2. A method according to claim 1, wherein the infrared spectral absorption being measured comprises the absorption of a carboxyl group.

3. A method according to claim 2, wherein said measuring step determines a carboxylic acid concentration value based on subjecting the infrared spectral absorption to Fourier transformation.

4. A method according to claim 3, wherein said controlling step controls at least one of esterification and polymerization in said polycondensation reaction on the basis of said carboxylic acid concentration value.

* * * * *